I. NOYES.
Manufacture of Salt.
No. 3,563.
Patented April 25, 1844.
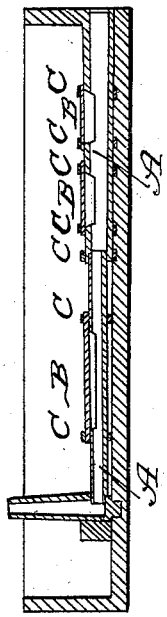
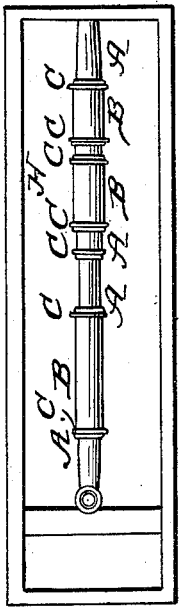
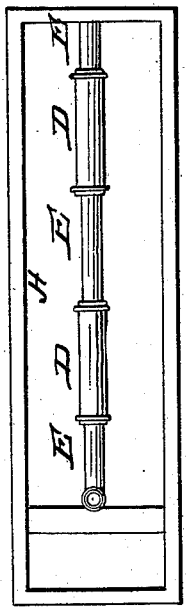
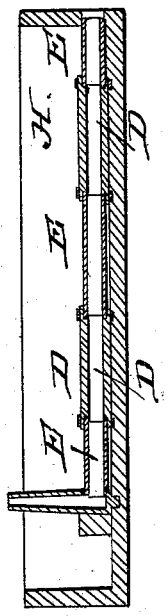
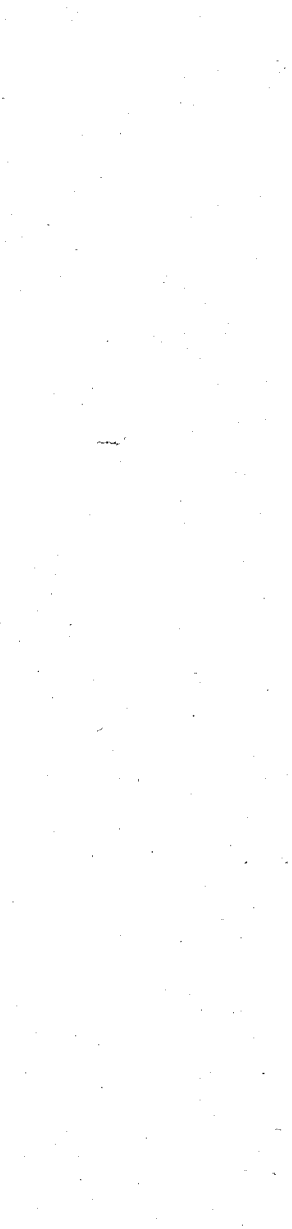

UNITED STATES PATENT OFFICE.

ISAAC NOYES, OF KANAWHA SALINE, VIRGINIA.

IMPROVEMENT IN MAKING SALT.

Specification forming part of Letters Patent No. 3,563, dated April 25, 1844.

*To all whom it may concern:*

Be it known that I, ISAAC NOYES, of the Kanawha Saline, in Kanawha county, and State of Virginia, have invented a new and useful improvement in the mode of manufacturing coarse or alum salt by steam conveyed through pipes made part of wood—a non-conductor of heat—and part of metal—an active conductor of heat—of which the following is a specification.

To understand the improvement of the said ISAAC NOYES, the ordinary mode of manufacturing steam salt should be explained, which is as follows: The salt-water is first boiled in a large pan placed immediately over the fire in the furnace, and after the salt-water is reduced nearly to saturation the brine is drawn from the pan into settling-cisterns, where it remains until it becomes perfectly clear. Then it is drawn into the granulating cistern, through which metallic pipes are run, and through which pipes the steam generated by the pan boiling the salt-water aforesaid is conveyed. The difficulties in making coarse or alum salt by this process consists in this, first, when a sufficiency of steam is admitted into the metallic pipes to force its way freely through, the temperature of the brine in which the pipes are immersed is raised so high that coarse or alum salt cannot be formed; second, if the quantity of steam admitted into the pipes aforesaid is so diminished as not to raise the temperature of the brine above the proper degree for the manufacture of coarse or alum salt, the steam is so rapidly condensed as to form an obstruction to itself, and prevent its passage to any considerable extent through the pipes; third, in manufacturing coarse or alum salt a uniform heat should be preserved throughout the granulating-cistern, which cannot be done in the ordinary application of steam by the use of metallic pipes. If a sufficiency of steam is applied to force its passage rapidly or freely through the pipes, the brine becomes too hot, as stated in the first difficulty, and if reduced the brine will be heated only at the end of the cistern where it is admitted, and at the other end the brine is unaffected by the steam, and at the same time the pipes and pan are endangered by the reaction of the steam, which is occasioned by the resistance created by the steam when rapidly condensed in the pipes.

By my improvement I obviate these difficulties by the construction and use of pipes, as hereinafter described. After preparing the furnace and cistern, as aforesaid, for making salt by steam, I make a pipe of wood and metal—the one a conductor, the other a non-conductor of heat—in the manner following: Make a wooden pipe, A, Figures 1 and 2, the entire length of the cistern by boring logs to the caliber desired and putting them together, in the usual way, by reaming out one end and sharpening the other, and banding the receiving end with strong iron bands and making the joints water as well as steam tight. When this row of wooden pipes is so united the length of the cistern and resting on the bottom thereof cut down, at equal intervals, on the top of the wooden pipe to the hollow thereof, and at each place to the center of the pipe, making the sum of all the places so cut down in the wooden pipes equivalent to about one-half the entire length of the pipes. Take thin sheets of copper or lead B or other metal, and nail them around the pipes and over the places so cut out, using copper nails, whereby the metallic plates cover the places so cut out, as aforesaid, and to that extent constitutes a part of the pipe through which steam may pass. To make the seams between the copper plates and the wooden pipes aforesaid water as well as steam tight, put iron bands C around the pipes and over the plates. When the steam passes through the pipes, the heat of the steam is only partially communicated to the brine in which the pipes are immersed through the metallic plates aforesaid only, whereby a less quantity or the proper quantum of heat is equally distributed from one end of the granulating-cistern to the other. The amount of heat communicated to the brine may be easily increased or diminished by the increase or diminution of the size of the openings in the wooden pipes, which are covered with metallic plates, as aforesaid, in which the operation must be governed as the circumstances may require, and which must depend mainly on the size of the granulating-cistern. The same result may be attained thus: Make a pipe of the proper caliber, the length of the granulating-cistern of alternate pieces of wood and metal, each ten feet in length, united as aforesaid, so as to make the seams water as well as steam tight, (see Fig. 2,) letter D representing the wooden part of the pipe and letter E representing the metallic part of the pipe. By this plan a continuous pipe of wood and metal is constructed, through which the steam may pass, imparting its heat to the brine only through the metallic portion of the pipe. By this pipe the same steam which would pass only ten feet in a metallic pipe is carried twenty feet, and if it would pass twenty feet in a metallic pipe in this it will pass forty, and so on to almost any given length, and arises from the fact that wood is almost a perfect non-conductor of heat. The proportions between the wooden and metallic parts of the pipe may be changed also to suit any particular case, as required. The pipe may be sinuous or straight, as required, the whole object of using the wooden non-conductor being intended to equalize the heat in the cistern, and at the same time reducing the temperature to a point suitable for the manufacture of coarse or alum salt, which it is believed cannot be successfully done without uniting in the construction of the pipe a non-conductor in some way with a conductor of heat. By either of the pipes before described it is alleged that the difficulties of making coarse or alum salt, aforesaid, are overcome. The steam is readily passed through the pipes without raising the temperature of the brine too high for the manufacture of coarse or alum salt, the condensation of the steam is not so great as to produce reaction which cannot be overcome and that without danger, and the heat is equally distributed throughout the granulating-cistern.

What I claim as my invention, and which I desire to secure by Letters Patent, is—

The pipe constructed in either of the methods herein described, part wood and part metal, alternating and passing through the cistern, either sinuous or in a straight line from one end of the cistern to the other, one a conductor of heat and the other a non-conductor, the one passing the heat to the brine, and the other retaining the heat and passing the steam to the next metallic pipe, and so on to the length of the pipe, whereby the heat is distributed alike to all parts of the brine, and its temperature preserved to a degree suited to the manufacture of coarse or alum salt, and equalized throughout the cistern. Any material which will produce the same result may be used for the construction of the pipes, and boxes made of plank may be used instead of wooden pipe logs, but they are more liable to leak.

In testimony that the above is a true specification of my improvement, as above described, I have hereunto set my hand this 6th day of April, 1844.

ISAAC NOYES.

Attest:
 ANDREW PARKS,
 BENJ. H. SMITH.